Patented Jan. 8, 1952

2,581,597

UNITED STATES PATENT OFFICE 2,581,597

PROCESS FOR THE REDUCTION OF IRON ORES AND THE LIKE BY CARBON

Raoul Nissim, London, England

No Drawing. Application October 21, 1948, Serial No. 55,827. In Great Britain October 24, 1947

2 Claims. (Cl. 75—11)

The present invention relates to a reduction process which combines the advantages of electric smelting and a high thermal efficiency.

The new process makes it possible to reduce iron ores or iron-bearing ores without metallurgical coke, to carry out electric smelting processes where power is produced at high cost, to lower the power consumption for the production of ferro-alloys, to supply a substantial amount of the heat required by the smelting operation by means of inexpensive fuels, and to produce iron in qualities superior to those of blast furnace irons.

It has heretofore been proposed to reduce oxides by passing them through a rotating kiln heated by the gases obtained from an electric furnace. It has also previously been proposed to melt iron ore by heating it in an oxidizing atmosphere in a melting furnace by the combustion of carbon containing gas, periodically removing the slag until a bath of molten iron oxide containing some reduced iron is obtained and continuing the heating in a reducing atmosphere to reduce the oxide and if necessary carburize the iron produced. The molten oxide may also be reduced and carburized in a separate furnace by the use of reducing gases.

In contrast to this, the inventive method of reducing iron ores or iron-bearing ores to obtain molten carburized metal, consists in melting the charge of ore, with or without slag, and charging the molten mass together with carbonaceous material into a substantially closed reduction hearth, the heat for melting said charge of ore, with or without the slag, being supplied from one or more non-electrical external sources other than by direct oxidation of the carbonaceous material, which latter is directly oxidized in the said substantially closed hearth by means of the oxygen of the molten ore, such additional heat as may be required being supplied to the reduction hearth and at least a part of the gas liberated during the reduction being recovered.

As iron ores or iron-bearing ores there are preferably employed iron containing materials such as oxides, carbonates, hydrates, silicates of iron or other iron compounds, or manganesiferous, chromiferous, nickeliferous iron ores or similar ores, or any material containing iron but not classified as such, for example, chromite, iron-rich bauxite and slags, pyrites and their residues, or the like.

In a preferred form of the invention molten iron ore is charged in a furnace hearth substantially closed and almost free from oxidizing gases, such as air or oxygen. This closed furnace can be, for example, an electrically heated furnace. The liquid ore charge may also contain slag formed by adding slagging and fluxing agents, such as lime, silica, fluorspar, or the like, to the iron ore charge, preferably, before it is preheated and melted. In the reduction hearth solid carbonaceous material is also added, in substantially the amount necessary to reduce the ore, carburet the reduced metal and partly the small amount of carbon dioxide contained in the reduction reaction gas. Consequently, the oxidation of the carbon is substantially carried out with the aid of the oxygen of the ore, and its gasification is mostly due to this combination. Therefore, this gas is substantially composed of carbon monoxide and by small percentages of other gases, such as carbon dioxide, hydrogen, nitrogen, hydrocarbons, and traces of other gases.

Normally, the carbon dioxide content is not substantial, as this gas is partly converted to monoxide when rising in the hot carbonaceous column on its way to the gas offtakes.

The furnace in this process step acts as a natural gas carburetor. Usually this conversion is not important as the gas released by the high temperature reduction reaction is mostly carbon monoxide.

The higher the carbon monoxide content of the gas, the more efficient will be the recovery, under combustible gas, of the total carbon supplied to the reduction. If, for example, $Fe_3O_4$ is reduced and all the gas is carbon monoxide, the latter contains about 70% of the total calorific value of the reduction carbon.

The recovery of such gas is important. To reduce the heat requirement of the strongly endothermic reduction reaction, the volume of gas recovered will be first deprived of its sensible heat to a great extent.

This gas constitutes, essentially, a valuable heat source. If its potential calorific content is released by integral oxidization of the combustible gases and the energy thus released transferred to the process, the heat to be supplied to the latter by means of a given heat source, will be reduced proportionately. Thus the reduction carbon can be integrally oxidized in the process itself.

With this end in view and in accordance with a preferred form of the invention, at least part of this potential calorific content of the reduction reaction gas will be supplied to the ore charge by preheating it by means of the gas. Cold or hot air and/or oxygen may be used to burn this gas. Once the charge is melted, a substantial amount of heat can be stored in the liquid mass, which constitutes the vehicle for returning this thermal energy to the reduction reaction. The complementary heat requirement of the endothermic reduction reaction will have to be supplied by a heat source other than carbon in its solid state.

The recovered reduction reaction gas may be used either alone or together with at least one auxiliary heat source other than reduction carbon to preheat and preferably melt the ore charge before its substantial reduction. It is known that loss of oxygen occurs under certain preheating conditions, for example, the partial dissociation of $Fe_2O_3$ to $Fe_3O_4$, or the conversion of carbonates to oxides through loss of $CO_2$ or other partial dissociations without incurring loss of carbon.

Preferably, gaseous, fluid, or solid fuels may be used as auxiliary heat sources supplying a substantial amount of heat to the preheating and melting phase of the process.

According to a second preferred form of the invention, at least part of the recovered reduction reaction gas may be used to generate electrical energy by means of thermal prime movers, such as gas turbines, internal combustion engines, steam boilers, and engines, or the like. The power thus generated may be supplied to the reduction process and preferably will be supplied to the reduction reaction hearth. The energy released by the oxidation of at least part of the recovered gas is likewise returned to the process in the form of electrical energy substantially used for heating purposes.

In this case, the use of at least one auxiliary heat source to store economically a substantial amount of heat in the ore charge is most valuable.

In a third form of the invention, at least part of the recovered reduction reaction gas may be used as a reducing agent, due to its high carbon monoxide content, for example, to pre-reduce and reduce iron ore in its solid state in a separate and self-contained furnace. The gaseous products recovered and still containing a high percentage of carbon monoxide may be, at least in part, integrally oxidized and the energy released substantially given to the reduction process.

In this particular case of chemical combination, the potential energy in the gas in indirectly supplied to the process in the form of already reduced metal, which constitutes a valuable addition to the carburetted molten metal, as the former is about free of carbon. The carbon and heat needed per ton of the final product will be less than those required when all the metal is reduced in its molten state, provided the gas production remains substantially constant. Consequently the gaseous reduction of the ore in its solid state is a substantial credit toward the smelting balance. Also, in this case, the use of an auxiliary heat source to supply a substantial amount of heat to the ore charge is a valuable addition.

According to the invention, the final preheating temperature of the ore charge is always the highest possible, so that a substantial amount of heat will be stored in the mass. Preferably, the temperature of the molten ore charge will be raised above its melting temperature. The temperature of the discharged reduced metal will preferably below the temperature of the ore charge when entering the furnace hearth.

Advantageously, the reduction reaction will be carried out in an electrically heated furnace or furnace section.

When using such furnace preference might be given to the known, closed, and substantially airtight low shaft smelting furnace with electrodes, gas offtakes, and charging devices. Any other furnace, if electrically heated, may be successfully employed.

In a further preferred form of the invention, heat may be supplied to the reduction reaction hearth by oxidizing part of the reduction reaction gas, in such a manner as to avoid oxidation of the carbon to any appreciable extent. Any carbon dioxide formed will be partly converted to monoxide by the inherent carburetting property of the furnace. To promote this regenerating process, the duration of the contact between carbonaceous material and recovered gas may be increased by reducing the speed and increasing the path of the gas in the reduction hearth.

In order to cool the gas energetically before its recovery in all the above cases, iron ore fines or finely ground ore, or metalliferous materials, may be added to the reduction so as to promote their direct pre-reduction and reduction substantially by means of the solid carbon and the sensible heat of the gas.

According to the invention, the preheating and melting phases may be carried out in an oxidizing and/or reducing atmosphere.

Any required metallurgical operation or treatment, such as slagging, fluxing, desulphurization, dephosphorization, or similar operations, or any additions such as sinter, ferro-alloys, steel, and iron-scrap, metalliferous materials may take place at any stage of the process.

At least part of the sensible heat of the gaseous products of the combustion and/or of the recovered gas may be used to supply pre-heat, for example to the air and/or oxygen, or surplus fuels used in the process. The preheating may be likewise effected by means of other sources.

If needed, the chemical composition of at least part of the gas recovered from the reduction reaction hearth may be changed before further use. For example, some of the carbon monoxide of the gas may be used for the preparation of hydrogen by any known method, the hydrogen thus obtained being re-used in the process.

Preferably, the complete smelting operation from solid raw materials to reduced and carburetted molten metal, according to this invention, will be carried out in one furnace, so as to raise the overall thermal efficiency to a maximum, whereby the fuel and, particularly, the electric energy consumption is reduced to the lowest possible value.

The furnace may have at least two sections, i. e. one for the preheating and melting of the ore and any slag contained therein, the other essentially constituting the hearth, in which the substantial reduction of the ore takes place, and in which the molten metal, the reduced liquid metal, the carbonaceous solid materials and any slag present ultimately collect.

The furnace may have a plurality of preheating and melting sections and a common hearth, or a preheating and melting section and a plurality of reducing hearths.

Any known type of furnace may be used.

If needed, slags having predetermined special characteristics, for example, slags with hydraulic or Portland cement clinker characteristics may be produced at any stage of the process. These slags are formed for the most part during the preheating and melting phase and can, for example, be partly or completely discharged from the furnace and the molten, almost slag-free, iron ore is allowed to be melted in said furnace.

Finally, according to the invention, any iron quality such as acid, basic, or other quality, or any iron alloy such as spiegeleisen, ferro-chrome, ferro-manganese, ferro-silicon, or other alloys may be produced by the proposed method. When smelting very high-grade alloys, for example, ferro-silicon containing 95% of silicon, the operation is almost slagless, as the ore charge is melted without the addition of slag-forming agents.

It will be understood that no limitation of the scope of the invention is intended by the employment of examples for the purpose of illustrating the principles thereof.

Having thus described the nature of the present invention, what is claimed as new and desired to be secured by Letters Patent is:

1. A process for the continuous reduction of iron-bearing ores by carbon which comprises premelting the ores in a separate chamber and prior to their introduction into the reducing hearth, allowing the molten ores to percolate through and contact solid carbonaceous reducing material contained in a substantially air-tight reducing hearth which is continuously electrically heated whereby the molten ores are reduced by the carbon to molten metal and the carbon is partially oxidized by the oxygen of the molten ores to generate a gas mixture consisting essentially of carbon monoxide, recovering the molten metal, and utilizing the heat energy stored in said gas mixture to premelt the ores.

2. The process of claim 1, in which part of said gas mixture is employed to partially reduce the solid ores before melting them.

RAOUL NISSIM.

REFERENCES CITED

The following references are of record in the file of this patent:

UNITED STATES PATENTS

| Number | Name | Date |
|---|---|---|
| 815,016 | Heroult | Mar. 13, 1906 |
| 859,572 | McDonald | July 9, 1907 |
| 1,334,004 | Van der Toorn | Mar. 16, 1920 |
| 1,338,439 | Greenwood | Apr. 27, 1920 |
| 1,796,871 | Madorsky | Mar. 17, 1931 |
| 2,067,373 | Basset | Jan. 12, 1937 |
| 2,133,571 | Rochling | Oct. 18, 1938 |